(12) United States Patent
Pruitt

(10) Patent No.: US 12,271,852 B2
(45) Date of Patent: Apr. 8, 2025

(54) SYSTEMS AND METHODS FOR MULTI-CHANNEL CUSTOMER COMMUNICATIONS CONTENT RECOMMENDER

(71) Applicant: OPEN TEXT SA ULC, Halifax (CA)

(72) Inventor: Byron Steven Pruitt, Lexington, KY (US)

(73) Assignee: OPEN TEXT SA ULC, Halifax (CA)

(*) Notice: Subject to any disclaimer, the term of this patent is extended or adjusted under 35 U.S.C. 154(b) by 0 days.

(21) Appl. No.: 17/191,521

(22) Filed: Mar. 3, 2021

(65) Prior Publication Data

US 2021/0279658 A1    Sep. 9, 2021

Related U.S. Application Data

(60) Provisional application No. 62/984,667, filed on Mar. 3, 2020.

(51) Int. Cl.
*G06Q 10/0637* (2023.01)
*G06Q 30/02* (2023.01)
(Continued)

(52) U.S. Cl.
CPC ..... *G06Q 10/0637* (2013.01); *G06Q 30/0201* (2013.01); *G06Q 30/0204* (2013.01); *G06Q 30/0281* (2013.01)

(58) Field of Classification Search
CPC .......... G06Q 10/0637; G06Q 30/0201; G06Q 30/0204; G06Q 30/0281
(Continued)

(56) References Cited

U.S. PATENT DOCUMENTS

| 2008/0066181 | A1* | 3/2008 | Haveson | H04N 21/8355 726/26 |
| 2016/0140577 | A1 | 5/2016 | Morley | |

(Continued)

OTHER PUBLICATIONS

Office Action issued in U.S. Appl. No. 17/959,527, mailed Oct. 6, 2023, 15 pages.
(Continued)

*Primary Examiner* — Francis Z. Santiago Merced
(74) *Attorney, Agent, or Firm* — SPRINKLE IP LAW GROUP

(57) ABSTRACT

Interaction events collected across disparate customer communication channels of an enterprise are processed to generate an encoded unique content item identifier for each content item referenced in an interaction event such that the content item is resolvable to a location in a content repository. A training data set is built using the interaction events thus processed and a multi-channel content recommendation model is trained using the training data set. The multi-channel content recommendation model thus trained stores data points representing intersections of customers and content items that the enterprise has been tracking, with each data point having an effectiveness score for an associated content item. The multi-channel content recommendation model thus trained can be queried by content designers of the disparate customer communication channels through a recommender application for content recommendations based on the effectiveness of the content, agnostic to the disparate customer communication channels.

20 Claims, 8 Drawing Sheets

(51) Int. Cl.
*G06Q 30/0201* (2023.01)
*G06Q 30/0204* (2023.01)

(58) Field of Classification Search
USPC .......................................................... 705/7.36
See application file for complete search history.

(56) References Cited

U.S. PATENT DOCUMENTS

| | | |
|---|---|---|
| 2016/0210321 A1 | 7/2016 | Gong |
| 2016/0373817 A1 | 12/2016 | Drake |
| 2018/0075137 A1* | 3/2018 | Lifar .................... G06F 16/337 |
| 2020/0065831 A1* | 2/2020 | Shachaf ............. G06Q 30/0201 |
| 2020/0402015 A1* | 12/2020 | Ozcaglar ............... G06F 16/906 |

OTHER PUBLICATIONS

Office Action issued by the U.S. Patent and Trademark Office (USPTO) for U.S. Appl. No. 17/959,527, mailed Dec. 6, 2024, 12 pages.

Office Action issued by the U.S. Patent and Trademark Office (USPTO) for U.S. Appl. No. 17/959,527, mailed Jun. 21, 2024, 25 pages.

\* cited by examiner

SYSTEMS AND METHODS FOR MULTI-CHANNEL CUSTOMER COMMUNICATIONS CONTENT RECOMMENDER

CROSS-REFERENCE TO RELATED APPLICATION(S)

This application claims a benefit of priority under 35 U.S.C. § 119 (e) from U.S. Provisional Application No. 62/984,667, filed Mar. 3, 2020, entitled "SYSTEMS AND METHODS FOR MULTI-CHANNEL CUSTOMER COMMUNICATIONS CONTENT RECOMMENDER," which is hereby fully incorporated by reference herein.

FIELD OF THE INVENTION

This invention relates generally to customer experience management. More particularly, this invention relates to systems, methods, and computer program products for discovering and applying effective enterprise content across multiple channels, useful for customer experience management.

BACKGROUND OF THE RELATED ART

Customer experience management (CEM) generally refers to the process that enterprises use to manage and track interactions with their customers. An important part of CEM is the management of customer communications. Traditionally, customer communications follow a linear communication model in which a sender or source sends out a message to customers and potential customers alike either by broadcast (e.g., television networks, radio stations, etc.) or print (e.g., newspapers, magazines, etc.).

With the advent of the Internet, the linear communication model is no longer adequate and multi-channel customer communication platforms have become a necessity for modern CEM. Today, a multi-channel customer communication platform can communicate, often electronically over the Internet, multiple content components-text, images, video over multiple customer communication channels (which are referred to herein as "channels").

In this disclosure, a channel refers to a means for an entity (e.g., a company, an organization, etc., which is generally referred to herein as an "enterprise") to interact with a customer. Some channels can be characterized as distribution channels where no interactions take place between a sender (e.g., a source such as a person or a computer at a TV or radio station) and a recipient (e.g., a potential customer such as a viewer or listener), while others can be characterized as interactive channels where there is some interaction between a sender (e.g., an email sender) and a recipient (e.g., an email recipient who replies to an email from the sender, clicks on a link in the email, and/or opens an attachment to the email). Examples of content that can be communicated through these channels can include, but are not limited to, electronic documents, printed documents, emails, short message service (SMS) messages, web pages, social media, videos, images, etc.

An enterprise wishing to communicate with their customers and/or potential customers through such channels often design and create content with a specific channel in mind. Further, the creation and distribution of such content often involve separate teams and encompass disparate design tools. For instance, a content designer for an email channel may create an email using a mail application, while a content designer for a print channel may create a poster using a drawing tool.

In some cases, the designed content (e.g., the email and the poster in the example above) may be stored in a content repository owned and/or operated by the enterprise. Modern content repositories usually provide certain search query capabilities. However, typically, these search queries are based on content metadata. While such search queries may return relevant search results, such search results may not be effective in reaching the target audience of a channel.

For instance, a content designer for an email channel may search the enterprise's content repository and find relevant images for use in an email targeting a life insurance customer. While the search results may return images relevant to life insurance, such search results will not include information on how effective any of the images might be in invoking, provoking, or otherwise causing a personalized positive response or action by the customer reading the email.

Other issues relate to the disparate nature of channel content distribution tools and the siloed nature of how content designers work to create content for different channels. These issues make it difficult to feature content across multiple channels in a way that is consistent and effective for individual customers and/or customer segments.

Further, designing relevant and effective content for all channels at scale is exceedingly difficult. What is more, today's customers increasingly expect personalized and timely content, making the enterprise's customer experience management even more critical.

In view of the foregoing, there is room for innovations and improvements in the field of CEM for multi-channel customer communication platforms.

SUMMARY OF THE DISCLOSURE

As alluded to above, content designers often design content with a specific channel in mind and they typically work in siloed design environments. For instance, a content designer for a print channel may create a printed document using a desktop publishing tool, while a content designer for a website may create a web page (e.g., a Hypertext Markup Language or HTML document) using a text-based editor. Typically, content designers of different channels create content using different platforms and different platforms may utilize different content repositories.

Thus, when designing content for customer communications across different channels, content designers may select content components from massive content repositories associated with various platforms. As such, a content designer for one channel (e.g., an email channel) may have no way of accessing content used in another channel (e.g., a print channel). Further, even if a content designer for an interactive channel is provided with access to a content repository for a non-interactive channel, there may not be a way to measure the effectiveness of a content item stored in that content repository because the content item is designed and used for the non-interactive channel and there is no way to track customer feedbacks and/or reactions through such a non-interactive channel.

To this end, a goal of the invention is to provide a data-driven solution for multi-channel customer communication platforms to discover and apply effective enterprise content across multiple channels. In embodiments disclosed herein, this goal is achieved in a system capable of deriving behavior-driven metadata across interactive and non-interactive channels, building a data set that includes such metadata, training a content recommender using the data set thus built so that each content item in the data set has an effectiveness score, and generating recommendations utilizing the effectiveness scores.

According to embodiments disclosed herein, the system includes an event pipeline. Customer communications events (e.g., click events) are collected across multiple channels and fed into the event pipeline. In the event pipeline, the collected events are processed and used to build a training data set for a multi-channel recommender model. Particularly, an interaction event concerning a content item is processed to encode both the content item and a content location in a content repository such that the content item is resolvable to the content location in the content repository. Regardless of source channels, all content items captured through interaction events are processed in the same or similar way so that they are resolvable across content repositories.

The training data set includes event-based data points representing certain intersections of a universe of customers and a universe of content items that an enterprise has been tracking through the customer communications events. Since it is practically impossible for all customers to interact with all content items, the training data set can be very sparse. That is, a matrix representing the universe of customers and the universe of content items can be very sparse with only event-based data points. Additional processing, therefore, is needed to fill out the sparse matrix. To this end, a recommender is operable to determine additional data points and compute associated effectiveness scores so that it can model the effectiveness of each content item in the universe of content items relative to each customer in the universe of customers. In some embodiments, this processing can be accomplished using an algorithm such as a collaborative filter, a content-based filter, or a combination thereof. In this way, the matrix representing the universe of customers and the universe of content items is filled with data points for the universe of customers and the universe of content items. Each data point in the multi-channel recommender model has a ranking that represents the effectiveness of a piece of content (e.g., a content item) for a particular customer. In one embodiment, the ranking can be a floating-point number between 0 and 1. For each respective content item, the multi-channel recommender model also stores a content reference that is addressable and resolvable to a particular repository where the respective content item resides.

According to embodiments, a user of a multi-channel customer communication platform (e.g., a content designer) can query a recommender that runs the trained multi-channel recommender model for content recommendations (e.g., what content might be effective for a particular customer). The recommender is operable to search one or more content repositories for relevant content items, decode item identifiers to resolve each content item's location, retrieve the content items, each of which has an effectiveness score, and return the content items as recommended content. Based on data derived from the interaction events processed by the system, each effectiveness sore indicates how effective an associated content item is in invoking a response from and/or action by the customer (e.g., positive customer responses captured by the interaction events). The content designer can select a content and/or combine additional content item(s) across channels. In turn, the overall effectiveness of customer communications is increased.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
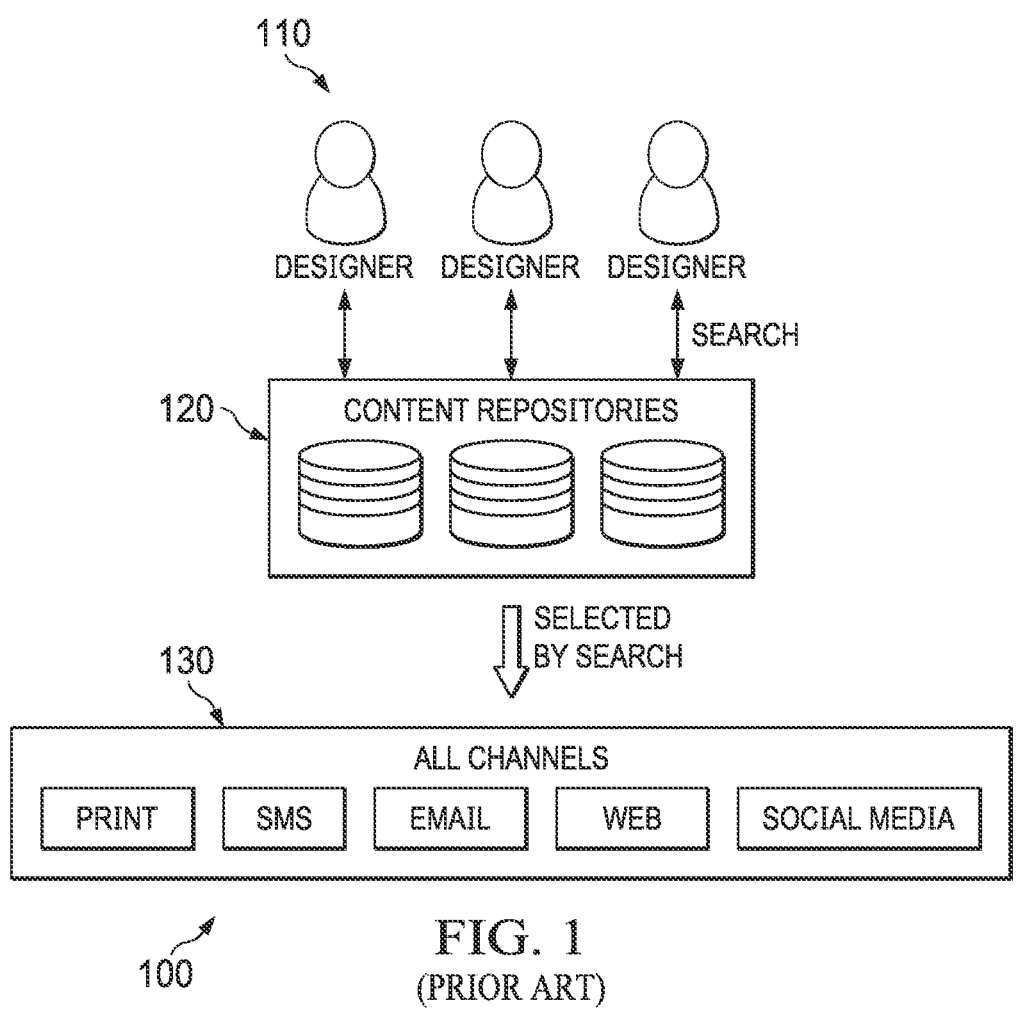
FIG. 1 depicts a diagrammatic representation of a conventional multi-channel customer communication platform in which content designers rely on the search capabilities of content repositories to conduct metadata-driven searches.

FIG. 1 depicts a diagrammatic representation of a conventional multi-channel customer communication platform 100. As illustrated in FIG. 1, current multi-channel customer communication solutions depend on content search to find applicable content, leveraging the search functionality provided by content repositories. However, these search queries are often based on content metadata and may not serve effective content (i.e., content invoking personalized positive responses or actions by a customer).

More specifically, in the example of FIG. 1, content designers 110 rely on the search capabilities of content repositories 120 to conduct metadata-driven (e.g., keywords, search terms, etc.) searches. Although a search engine may match content items stored in content repositories 120 to search terms provided in a search query, the content designer does not have any information on whether a piece of content referenced in the search result would be effective to invoke or provoke an action by or otherwise cause a reaction from a customer or customer segment (e.g., age group, demographic, geographic location, etc.).

Another issue here is that most content designers 110 work in separate teams (e.g., business correspondence team, web site team, customer support team, etc.) siloed for individual channels. Further, different teams may utilize different content design tools. Such distributed, disparate content design tools and teams also make it difficult to feature content over multiple channels in a manner that is consistent and effective for individual customers or customer segments.

Generally, content designers 110 have no way of automating the ability to determine content that would be effective to channel-specific customers across all the enterprise's product lines. Instead, a content designer in the business correspondence team may discover or develop an email for a business correspondence that includes an image. The content designer may determine, for instance, using a recommender, that the image would be effective in making a customer to go to a web page (e.g., per a conversion rate associated with using the image in prior emails to encourage customers to visit the web page). While the content designer may share this personal knowledge with another content designer in another team, this manual process is inconsistent, error-prone, time-consuming, unlikely to be reproducible, and may not cover all the channels. It would be desirable to automate this effective content discovery process and make the effective content available across all channels.

To an enterprise, customer interaction is a primary indicator of whether a customer likes or responds to content, i.e., whether the content is successful or effective from the perspective of the enterprise. Successful content (e.g., images or relevant text) that engages customers can result in higher content interaction.

For example, higher interactions result in click events on links in the content, which is the goal of most interactive content. Such click events can be captured by modern email systems, web page logging, social media mechanisms, and so on. In some embodiments, interaction events such as click events can be collected across disparate channels by various data processing systems such as an enterprise server system, an email service provider system, an email server system, a web browser, a message service provider system, a social media server system, a web server system, a print server system, and/or a data analytics service provider system, for instance, an adaptive big data service provider system. An example of a system suitable for providing an adaptive big data service is provided in U.S. Patent Application Publication No. US 2020/0012647 A1, which is incorporated by reference herein.

Figure 2:
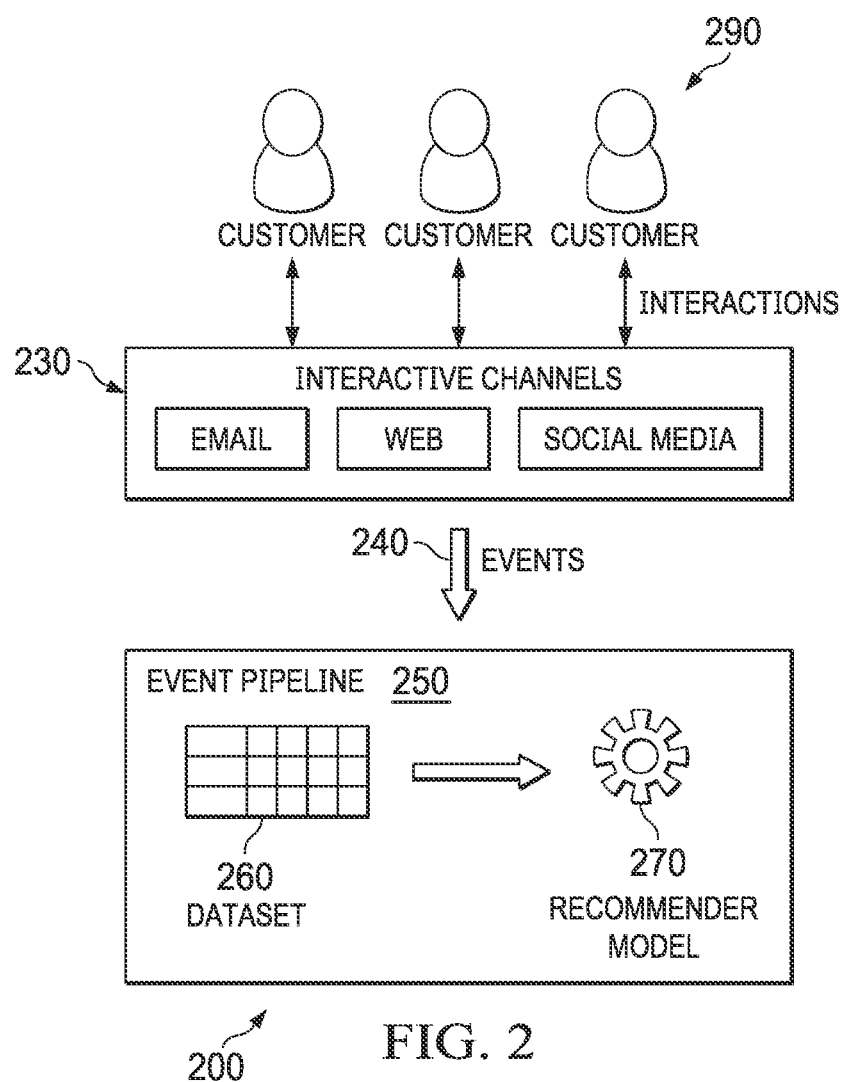
FIG. 2 depicts a diagrammatic representation of a process for building a multi-channel recommender model according to some embodiments.

FIG. 2 depicts a diagrammatic representation of a process 200 for building a multi-channel recommender model according to some embodiments. In some embodiments, customer interactions between customers 290 and interactive channels 230 can be captured as events 240, also referred to herein as interaction events.

In CEM, click events can indicate a journey planned by an enterprise for each of its customers to experience. For instance, when a website visitor visits a landing page, the website visitor is directed to a form associated with automatic billing. Click events captured by the website (e.g., captured in a web log by a web server hosing the website) can indicate whether the website visitor takes the journey from the landing page to the form and then to the automatic billing. As another example, an email provider may capture how an email recipient (e.g., a customer of the enterprise) has interacted with an email in their inbox (e.g., delete, open email the first time, subsequent opens, come back to the email more times, click events, etc.). Such interaction events can be captured across interactive channels 230 (e.g., by content provider system(s)) and sent to an endpoint of event pipeline 250.

After interaction events 240 are received, they are processed through event pipeline 250 to produce training data set 260. A goal here is to collect interaction events enough to build training data set 260. This training dataset is utilized to train recommender model 270. In some embodiments, this can be an ongoing process (e.g., periodically, continually, or on-demand) to keep recommender model 270 up to date.

In some embodiments, the recommender is initiated with received customer data. The customer data includes interactions expressing how each customer relates with the content. The specifics of the customer data can depend on the media type. Importantly, all interactive media types feature at least one primary implicit interaction that indicates customer engagement, for example, clicks, views, watch, revisit interactions, and so on. These events signal indications of a positive response (e.g., "like") for the content. These events can be captured by, for instance, content providers.

The training dataset contains multi-channel interaction events. Accordingly, recommender model 270 can be characterized as a multi-channel content recommendation model. In some embodiments, a scalable machine learning algorithm such as Mahout can be used to implement a multi-channel content recommender.

In some embodiments, the multi-channel content recommender can be implemented in various ways using algorithms. For instance, collaborative filtering is a technique used by recommender systems. In this case, a collaborative filtering algorithm can be leveraged to compare the likes and dislikes across the enterprise's customer base. Another technique is content based and examines the similarity between content items. For example, if a customer liked A and B is similar to A, then B would be recommended for the customer. There are multiple implementations of these algorithms. Other machine learning techniques can also be used to implement the multi-channel content recommender.

In some embodiments, the multi-channel content recommender is operable to score a content item referenced in an interaction event based on a customer "likes" or "dislikes" as indicated by the customer's primary interaction with the content item. A click or revisit signal is considered the maximal signal or interaction for content. Higher content scores mark more effective content and has a leading placement in a recommender response.

For instance, a content designer developed an email with a clickable image. The email is sent through an email channel to a customer. The customer clicks on the image and is taken to a web page. This click event represents a conversion event for the email channel. In this example, because the customer clicks on the image, the image represents effective content for at least the email channel. Accordingly, in the multi-channel recommender model, the image will have a higher ranking (e.g., a floating-point number that is closer to 1). As another example, suppose a piece of text in a business correspondence (e.g., a printed document such as a statement for a phone bill; a credit card bill; an email; a phone application; a website; a web page; a customer contact card, etc.) invites a customer to take action (e.g., a phone number for the customer to call in, a universal resource locator for the customer to visit, etc.) and the customer takes the action. In such a case, the piece of text represents effective content for at least the print channel.

In this way, the captured interaction events can be processed in event pipeline 250 into training data set 260, which is then employed to train recommender model 270. A multi-channel content recommendation model thus trained has an effective content measurement (e.g., a score) for each piece of content used (and owned) by an enterprise to communicate with its customers. The multi-channel content recommendation model can be augmented with content metadata to refine recommendations. Examples of content metadata can include, but are not limited to, concepts, entities, and sentiment.

In some embodiments, the multi-channel content recommendation model can be queried (e.g., by content designers of different teams) through a user interface of a multi-channel content recommender disclosed herein. Through this multi-channel content recommender, content designers can have access to all the content items used across all the channels of an enterprise. This is further illustrated in FIG. 3.

Figure 3:
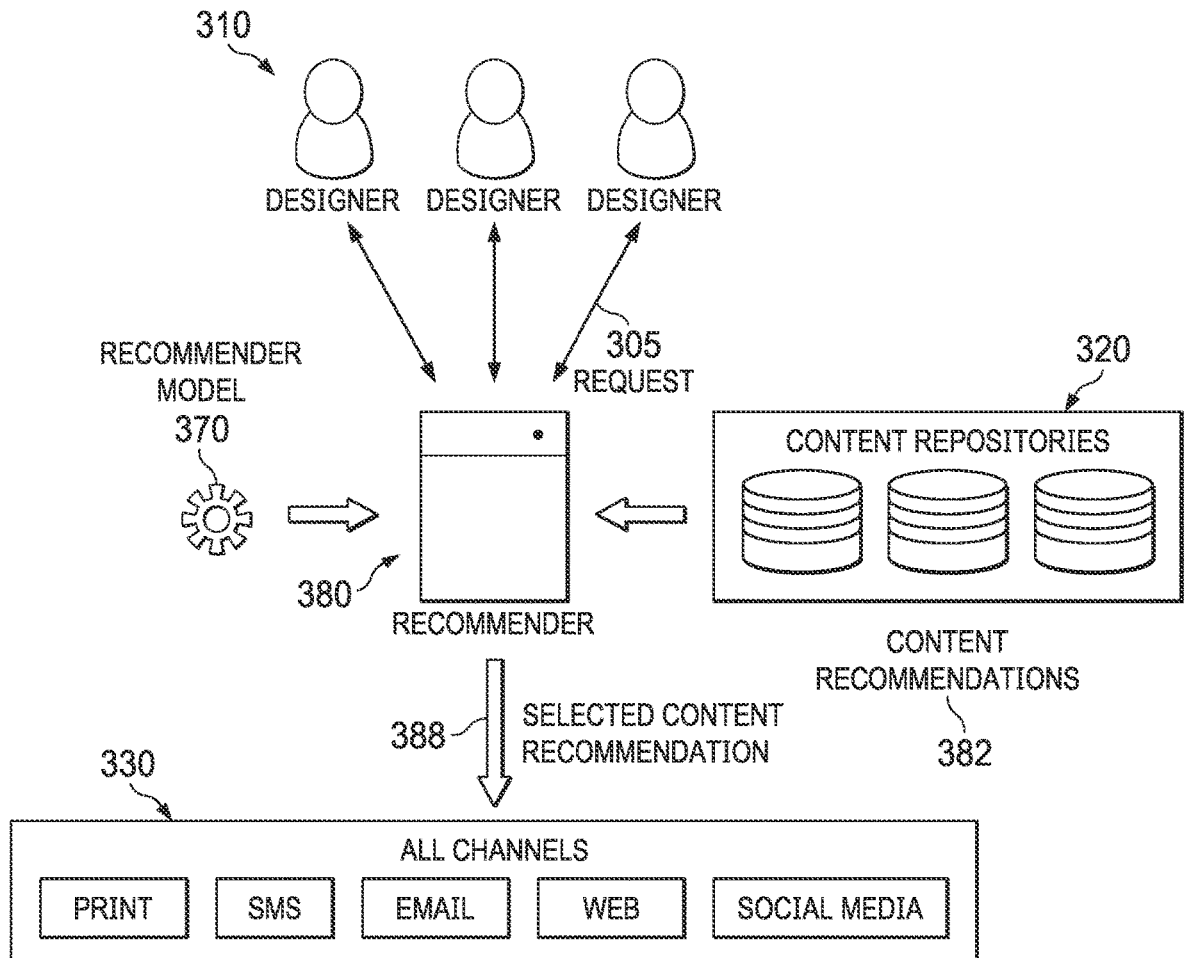
FIG. 3 depicts a diagrammatic representation of a multi-channel customer communication platform that enables content designers to query the multi-channel recommender model of FIG. 2 for effective content according to some embodiments.

FIG. 3 depicts a diagrammatic representation of a multi-channel customer communication platform 300 operating in an enterprise computing environment. As shown in FIG. 3, multi-channel recommender model 370 is accessible by each of a plurality of distributed content designer teams 310 responsible for different content channels 330.

At any given time, any number of distributed content designer teams 310 may query multi-channel recommender model 370 for effective content. Each query can additionally be filtered with content metadata if the content designer needs to match content recommendations to a specific context. In some embodiments, content queries can be based on individual customers or customer segments (e.g., age, gender, socioeconomic status, household income, geographic location, etc.).

As a non-limiting example, a content designer can send a request 305 to recommender 380 (through a user interface provided by recommender 380) requesting a recommendation(s) on content that would be effective in communicating with a customer. Recommender 380 is operable to consult a multi-channel content recommendation model (e.g., recommender model 370) with information about the customer. Recommender model 370, in turn, returns content recommendations 382. Each of content recommendations 382 contains a content reference that is addressable and resolvable to a content item stored in content repositories 320. The content item has an effectiveness score (e.g., a floating-point number) previously determined by recommender model 370. The effectiveness score for the content item is also presented to the content designer. In this way, the designer can select, from recommendations 382, content recommendation 388 that has the highest score or ranking on effectiveness. In some embodiments, selected content recommendation 388 can be combined with additional content and distributed across multiple channels (e.g., all or a portion of channels 330).

In this disclosure, content designers can include creatives who design and/or author customer communications that will be pushed out to customers through channels 330. Querying recommender model 370 can take place when a content designer is designing/authorizing a customer communication.

As a non-limiting example, for instance, a content designer is designing an email for a customer of an enterprise for which the content designer works. The content designer may want to put an image in the email and make the image clickable or otherwise selectable by a receipt of the email. The designer can query recommender 380 to find an effective image for this particular customer to be included in the email. In response, recommender 380 may access recommender model 370 to find an image or images that would be effective for this purpose. Recommender 380 may return multiple images that it has found to be effective (e.g., a list of 10 recommendations sorted by score). The content designer can decide to use the recommended image(s) or do another search. For instance, if an image seems very effective in an interactive channel, the designer may decide to use it for a non-interactive channel (e.g., the printed document channel).

In some embodiments, recommender 380 can be characterized as a multimodal (characterized by several different modes of activity or occurrence) recommender. Traditionally, a recommender works on just one piece of information (e.g., a conversion event that comes from a data service provider). A multimodal recommender means that the content designer can include in a customer communication what they believe will correlate to the conversion event. This could depend on the demographic, device type, location, time of day, etc. which comes into the training data set. To facilitate the content design process, a rule-driven logic may be adapted to identify a customer and choose effective content to go into multiple channels such as an email, a website, and so on. The rules can be adapted for identifying a particular customer or customer segment for whom the piece of content is effective. As a non-limiting example, customer segmentation can be done using metadata to an image (e.g., age group, income level, family structure, etc.)

In some embodiments, the rule-driven logic can be implemented on a document engine or a document server. A content designer can indicate a desired customer segment for a customer communication. The document engine can apply rules to identify customers in the desired customer segment and query the multimodal multi-channel content recommender 380 for recommendation(s) on content that has been quantified (e.g., in a training process driven by collected interaction events) as being effective for those customers according to multi-channel recommender model 370. This approach can provide the desired scalability, for instance, in cases where a target audience might be huge (e.g., the customer communication is distributed as 100 million statements).

The effectiveness of each piece of content (e.g., a content item) can evolve over time. Thus, the effectiveness score associated with each piece of content and stored in recommender model 370 need not be fixed. As alluded to above, recommender model 370 is updated continuously. In some embodiments, updating/rebuilding recommender model 370 can entail continuously collecting interaction events (e.g., daily, hourly, etc.), building a new training dataset, and training another recommender model using the new training data set. This can take place on a daily, hourly, weekly, etc. basis. The later-built recommender model then becomes active and replaces the previous recommender model. This can be an ongoing process so that multi-channel customer communication platform 300 can keep up with the most recent events (by continuously building a new training dataset, training a new multi-channel content recommendation model, updating/replacing the old multi-channel content recommendation model, etc.).

In this way, the effectiveness of a piece of content is agnostic to customer communication channels and content designers no longer need to work in siloed environments. They can readily discover how effective a piece of content is in one channel and use it for another channel. This allows the content designers to focus on the content (e.g., an image that is agnostic to channels) and push it out across different channels. For instance, a multi-channel content recommendation model may indicate that an image is effective for life insurance customers. This image can be used for targeting life insurance customers in an email, on a social media, on a website, and/or any kind of correspondences to the life insurance customers.

In some embodiments, a multi-channel content recommendation model follows a schema for representing a universe of users and a universe of content items that the enterprise has been tracking for CEM purposes. As a non-limiting example, the schema may be organized into rows (e.g., customers) and columns (e.g., a unique reference for each column, for instance, one column can be for "user identifier" or "email address," another column can be for "content reference," yet another column can be for "event" that indicates a customer's interaction with a particular piece of content, and so on). Since it is practically impossible for all customers to interact with all content items, the multi-channel content recommendation model is operable to compute the effectiveness of a content item using an algorithm such as a collaborative filter, a content-based filter, or a combination thereof. Other techniques can also be used to compute effectiveness scores, for instance, matrix factorization, deep learning (as in an artificial neural network), and so on, driven by various factors of interest such as demographics, zip code, income, etc.

In this way, the multi-channel content recommendation model can model the effectiveness of each content item in the universe of content items relative to each customer in the universe of customers. That is, for every customer and for all the content items that the enterprise has been tracking through the interaction events, the multi-channel content recommendation model stores a ranking on effectiveness (e.g., a floating-point number between 0 and 1 in which the closer to 1 the higher the ranking is) and a content reference that is resolvable (i.e., it is unique) and addressable (i.e., it has address information on what content repository to go to resolve an associated content). The data points thus determined and stored in the multi-channel content recommendation model allow it to be queried for any particular customer for any content used in any of the channels.

Figure 4:
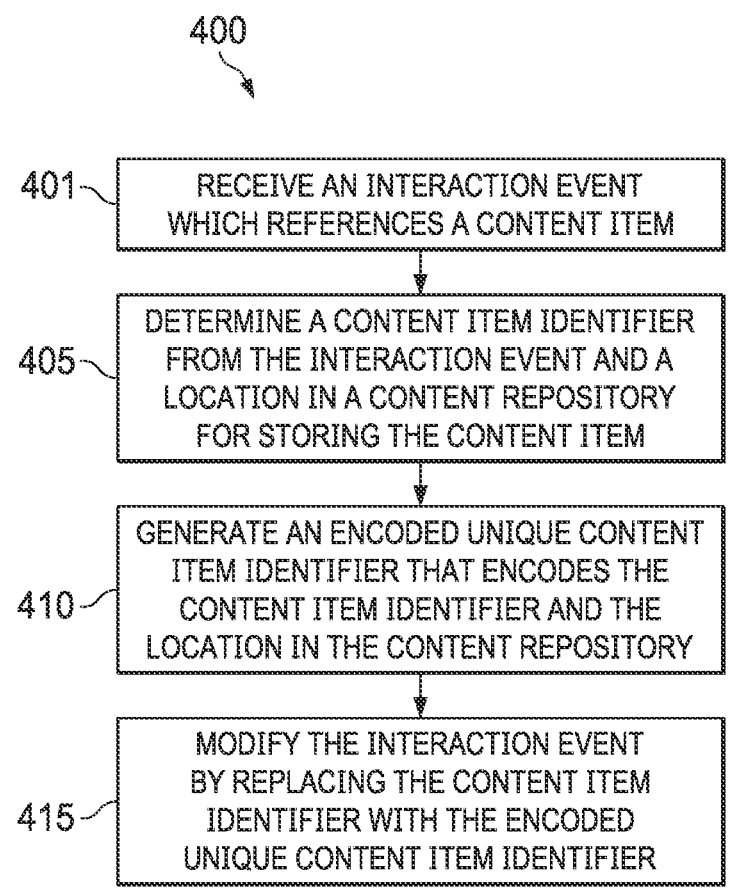
FIG. 4 is a flowchart showing an example of a method for processing an interaction event concerning a content item to encode both the content item and a content location such that the content item is resolvable to the content location according to some embodiments.

FIG. 4 is a flowchart showing an example of a method for processing an interaction event concerning a content item to encode both the content item and a content location such that the content item is resolvable to the content location according to some embodiments. Method 400 may include receiving an interaction event (401). Below is a non-limiting example of an interaction event that references a content item.

```
{
    "date":"2021-01-21T13:03:03:00.664-04:00",
    "data":{
        "event":"click",
        "item":"1-234-567-890"
    }
    "campaignId":"Seasonal Promotion",
    "user":{
        "firstName":"John",
        "lastName":"Doe",
        "userId":"100000001",
        "email":john.doe@gmail.com
    }
}
```

As illustrated in the above example, in addition to a customer identifier (e.g., "userID") and an event type (e.g., "event"), each interaction event contains a unique item identifier (e.g., "item"). With distributed content (i.e., content that may be distributed across multiple channels), such a unique item identifier is not enough to resolve a targeted content item. Content location must also be available. Base 64 encoding provides a reliable to way to encode both a location and a content identifier in a form that is accessible to recommenders disclosed herein.

Base 64 encoding is a function for representing a value in ASCII text. Typically, Base 64 encoding is used to encode binary data. However, in embodiments disclosed herein, this binary data is not required. Rather, a Base 64 decoding function is used to return the original value. For instance, applying a Base 64 encoding function f (x) to "1-234-567-890" (i.e., the text string representing the item identifier in the above example), returns an encoded value of "MSOyMzQtNTY3LTg5MCAg". Applying a Base 64 decoding function f (y) to the encoded value of "MSOyMzQtNTY3LTg5MCAg" returns the original value (i.e., "1-234-567-890").

Accordingly, in some embodiments, Base 64 encoding is utilized to encode both a content item and a content location as a unique content item identifier. Below is a non-limiting example that demonstrates how such an encoding can be done.

Suppose the content item referenced in the interaction event is to be stored in a content repository at a network location "http://host: port/service/content/1-234-567-890". Applying the Base 64 encoding function f (x) to this text string returns an encoded value of "aHROcDovL2hvc3Q6cG9ydC9zZXJ2aWNIL2NvbnRI bnQvMSOyMzQtNTY3LTg5MCAg" and applying the reversing Base 64 decoding function f (y) to the encoded value returns the original value "http://host: port/service/content/1-234-567-890" which contains both the content item identifier and the network location at which the content item is stored.

Thus, method 400 further includes determining a content item identifier for the content item referenced in the interaction event and a location in a content repository for storing the content item (405), generating an encoded unique content item identifier that encodes both the content item identifier and the location in the content repository (410), and modifying the interaction event by replacing the content item identifier with the encoded unique content item identifier that encodes both the content item identifier and the location in the content repository (415). The content item can then be stored at the location in the content repository.

Interaction events captured by the system are processed in the same or similar way regardless of event types and/or formats of raw event data received by the system. In this way, each interaction event thus processed by the system can be resolved (e.g., by applying a Base 64 decoding function as described above) to a particular content item stored at a particular network location (address).

Figure 5A:
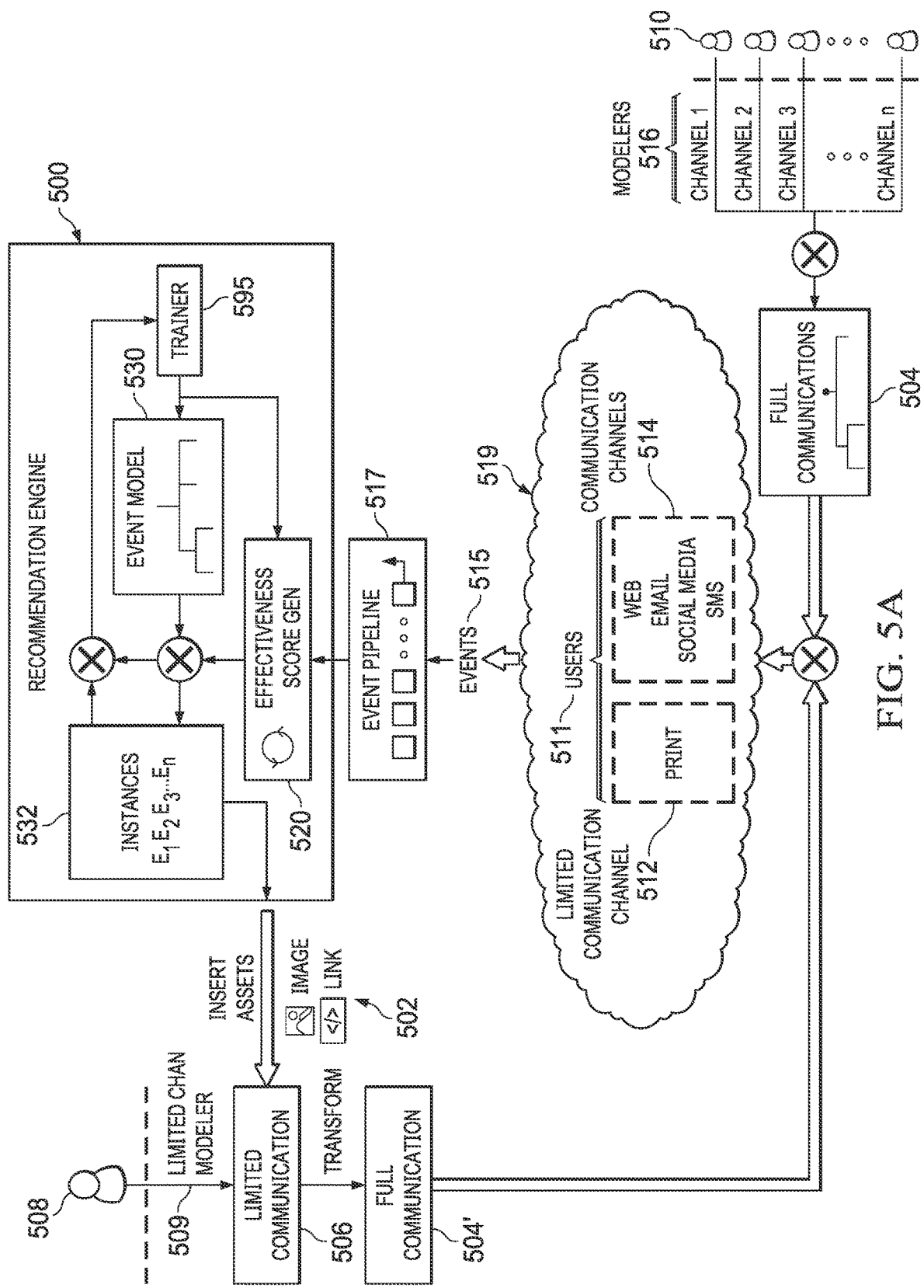
FIG. 5A illustrates example operations of a recommendation engine according to some embodiments.

In some embodiments, a recommender disclosed herein can be implemented as a recommendation engine. FIG. 5A illustrates example operations of a recommendation engine according to some embodiments.

Referring now to FIG. 5A, in some embodiments of the inventive subject matter, a communication technique, approach, and/or system comprises inserting information assets 502 (e.g., content items) from one or more full communications 504 (e.g., interactive content such as an email or web page with a clickable link) into a limited communication 506 (e.g., non-interactive content such as a printed document), thereby transforming the limited communication 506 into a full communication 504'. This transformation is further described below with reference to FIGS. 5B and 5C.

One of ordinary skill in the art will understand that a problem in the art is that a limited communication 506 over a limited communication channel 512 has a correspondingly limited set of interactions and/or communication feedback mechanisms in comparison with more richly interactive forms of communication channels 514. This can limit a communication designer's 508 ability to generate optimal communications over such limited channels 512. Inserting communication assets 502 from full communications 504 into limited communications 506, as will be explained in more detail hereinbelow, solves this problem by taking advantage of a rich set of generated events 515 associated with more interactive full communications 504 to beneficially augment limited communications 506.

In some embodiments of the inventive subject matter, a recommendation engine 500 processes and/or generates events 515 associated with a plurality of communication channels 514. The events 515 may be processed and/or generated via an event pipeline 517 recording interaction information (generally represented by the cloud designated by reference numeral 519) which occurs across a variety of computing devices and media. The interaction information 519 is associated with full communications 504 transmitted over the communication channels 514. In some embodiments, users 511 interact with one or more full communications 504 which causes generation of the events 515. The events 515 are processed by the recommendation engine 500. The recommendation engine 500 generates an effectiveness score 520 for each full communication 504.

Further, a limited communication 506 is generated for a limited communication channel 512 such that the limited communication 506 may be transmitted over the limited communication channel 512 where users 511 may or may not interact with the limited communication 506. In the spirit of the invention, full communications 504 each comprise at least one communication asset 502, wherein the at least one communication asset 502 is inserted into the limited communication 506 based on the effectiveness score 520 for one or more of the full communications 504. This transforms the limited communication 506 into a full communication 504' to be transmitted over one or more of the communication channels 514 and/or the limited communication channel 512.

In a further embodiment, the communication channels 514 comprise at least one of: a web channel, an email channel, a social media channel or a simple messaging system channel, and the limited communication channel 512 comprises a print channel. In a non-limiting example of a web channel, the full communication 504 is communicated over the web/Internet/Intranet or other network via a web page. In a non-limiting example of an email channel, the full communication 504 is communicated via an email server to an email access point. In a non-limiting example of a social media channel, the full communication 504 is communicated over a social media service including, but not limited to FACEBOOK, TWITTER, LINKEDIN, etc. In a non-limiting example of a SMS (short messaging service) channel, the full communication 504 is communicated over a text service including, but not limited to iMessage from APPLE company. Furthermore, in a non-limiting example of a print channel, the limited communication 506 is communicated via a hard-copy using, for example, a printer, a scanner, or other hard-copy output device.

Referring now to FIG. 5B and again to FIG. 5A, in further non-limiting embodiments, the recommendation engine 500 generates event models 530 representing events 515 and comprising event information and information corresponding to a full communication 504. In such embodiments, the event model 530 is a hierarchical data structure of interaction information 519 and is associated with a full communication 504. It should be understood that the hierarchical data structure model is only one technique for representing the event model 530, as others may be equally appropriate including, but not limited to, an array, a linked list, etc.

The event model 530 includes a representation of a full communication 539 and may further include a timestamp 540 designating the time of an event, an event source 542, a non-limiting example of which may include a designation of an advertisement server, a target 544, a non-limiting example of which may include a web URL where a user accesses and/or interacts with the full communication 504, and user statistics 546, a non-limiting example of which may include a unique ID, age, gender and other information for a subject user 511. The full communication representation 539 may further include an image 548, a non-limiting example of which may include a jpg image resource, a link 550, a non-limiting example of which may include a link forwarding the user's browser to a web page related to an advertisement, and a channel 552 designating one to the channels 514. In some embodiments, the link 550 comprises a QR code.

In further embodiments, the full communication representation 539 includes an effectiveness score 554, which further includes a conversion rate 556 and a time-to-conversion 558, both of which include values for generating the effectiveness score 520. The conversion rate 556 refers to the percentage of users 511 who view the image and click on the link to forward them as desired. The time-to-conversion 558 refers to the amount of time a user 511 views a web page with the image before clicking the link. An ordinary skilled practitioner in the art will recognize that there are many novel techniques for generating the effectiveness score 520. Here, in this embodiment, the conversion rate 556 and the time-to-conversion 558 are used to generate the effectiveness score 520, as will be explained hereinbelow.

The event model 530 is a generalized or unified representation of an event 515. In some embodiments, a set of events 531 are associated with a full communication 504 over a channel 514. In a non-limiting example, the recommendation engine 500 receives as input the set of events 531 and for each event (designated in FIG. 5B as EVENT 1, 560, EVENT 2 560', up to EVENTn, 560"), generates an instance 532 of the event model 530 for EVENT1 560 which comprises information associated with an event 515. In this example, the full communication 561 represents an advertisement campaign for a pet adoption agency. The EVENT1 instance 560 includes the event timestamp 562 of Jan. 25, 2021 at time 00:16:25 (HOUR: MINUTE: SECOND), the event source 563, which is an advertisement server named "CAMPAIGN PETS", the event target 564, which is a news server, and the user statistics 565, which includes the user ID, AGE, and GENDER.

Figure 5B:
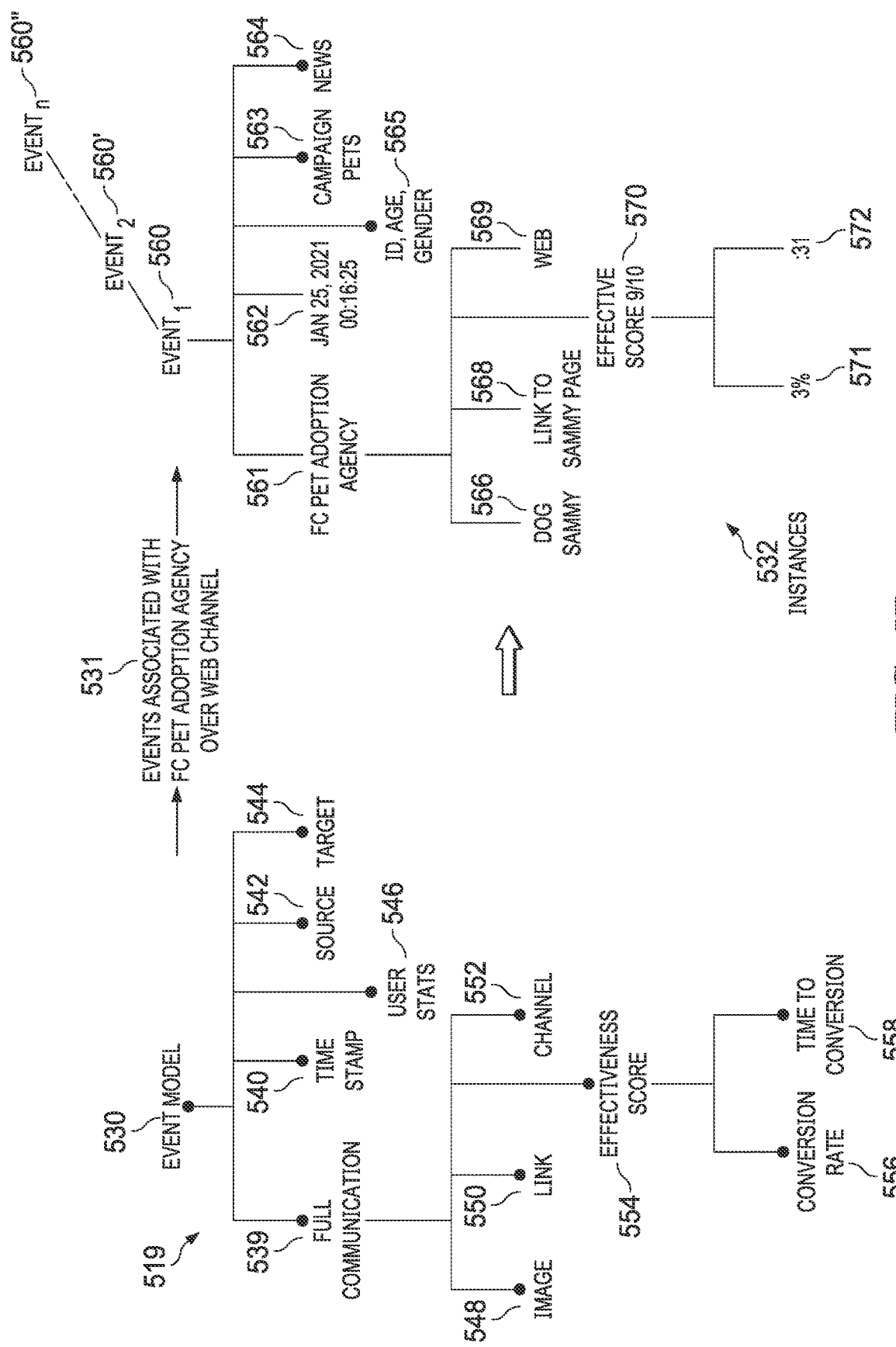
FIG. 5B illustrates an example of an event model that may be utilized for processing events according to some embodiments.
Figure 5C:
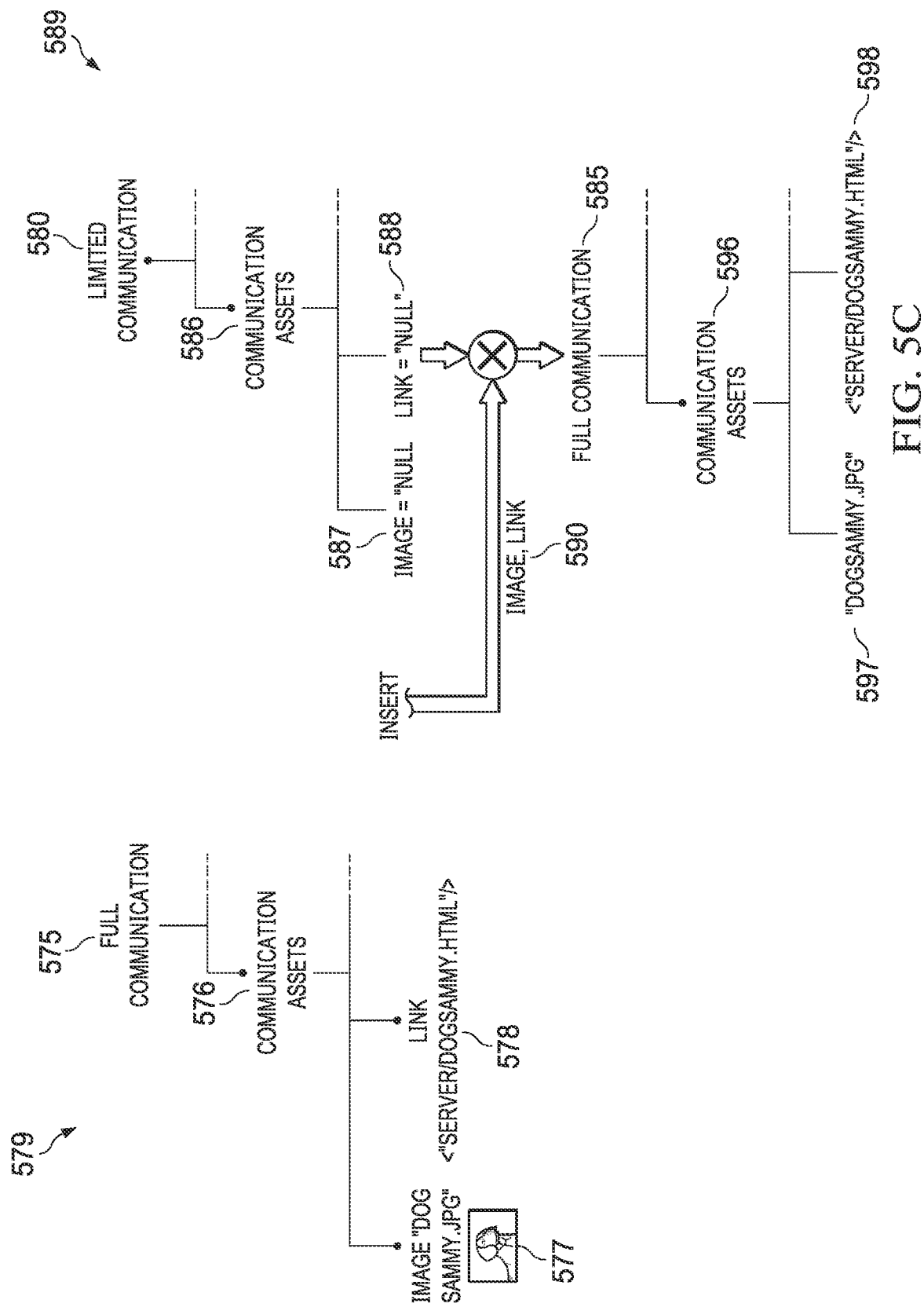
FIG. 5C illustrates example transformation of one channel type into another according to some embodiments.

In the example of FIG. 5B, the event instance 560 further includes the full communication 561 called "FC PET ADOPTION AGENCY", the image 566 "DOG SAMMY", the link 568 which links to a web page called "SAMMY PAGE", and the channel 569 which, in this example, is a web channel. The full communication 561 can be communicated over the web/Internet/Intranet or other network via a web page.

Further in these instances 532, the full communication 561 also includes the effectiveness score 570 which, in a non-limiting embodiment, includes the conversion rate 571 and the time-to-conversion 572. In a non-limiting embodiment, the conversion rate of 3% and the time-to-conversion of 31 seconds are combined in a function to generate a normalized effectiveness score in the range of 1-10 out of 10, here 9/10, where 10/10 represents the highest effectiveness score and 1/10 represents the lowest effective score of a full communication 561.

As more events 531 are inputted into the recommendation engine 500 associated with the full communication 561, the effectiveness score 570 may be regenerated and/or updated in a variety of ways. In a non-limiting example, the conversion rate 571 may be regenerated for a new instance of the full communication 561 (for example, the full communication 561 in event 560' up to 560") by taking the average of the conversion rates for each of past full communications instances and a new instance of the full communication. The regenerated conversion rate 571 may then be used to regenerate the effectiveness score 570 for the new instance of the full communication 561. As those skilled in the art will appreciate, other ways to compute the effective scores are also possible.

Referring now to FIG. 5C and again to FIG. 5A, in further embodiments, a full communication 575 is represented in a hierarchical data structure 579. The full communication 575 includes communication assets 576 which comprise an image 577 and a link 578. In a non-limiting example, the image 577 is a jpg file of a dog, "dogsammy.jpg", and the link 578 is to a server of a pet adoption agency with a URL equal to '< "server/dogsammy.html"/>'. It should be noted that the full communication 575 may take other data structural forms including, but not limited to, an array or a linked list.

A limited communication 580 is represented in a hierarchical data structure 589 and also includes communication assets 586 which, in some embodiments, include placeholders for at least one communication asset. In one non-limiting example, one placeholder 587 represents an image asset and is initially set to the "NULL" value and another placeholder 588 represent a link asset and is initially set to the "NULL" value. In one embodiment, the recommendation engine 500 inserts communication assets 590 from one or more full communications 575 into the limited communication 580. In still another embodiment, a modeler 509 depicted in FIG. 5A (e.g., a content designer) receives the communication assets 590 and inserts them into the limited communication 580.

In this way, the limited communication 580, with the insertion of the image and the link (generally designated by the reference numeral 590), is transformed into a full communication 585 and includes communication assets 596 which include image 597 equal to the image assert value for the full communication 575 ("dogsammy.jpg") and link 598 equal to the link asset value for the full communication 575 '< "server/dogsammy.jpg"/>'. In some embodiments, the choice of which image and link 590 to insert into limited communication 580 is based on the effectiveness scores 520 of the full communications 504. For example, in one non-limiting embodiment, the recommendation engine 500 selects the communication assets 576 for the full communication 575 with the highest effectiveness score 520, the rationale being that the full communication 575 with the highest effectiveness score 520 is the best performing full communication 575 in terms of user 511 conversions and time-to-conversion values.

Referring again to FIG. 5A, in still further embodiments, channel modelers 516 generate the full communications 504 via input received from communication channel modelers 510. Similarly, limited channel modelers 509 generate the limited communications 506 with input received from the communication channel modelers 508.

In some embodiments, the recommendation engine 500 employs a trainer 595 to train itself and augment aspects of the recommendation engine 500, such as the event model 530 and the generation of the effectiveness scores 520. For example, in some embodiments, the trainer 595 uses machine learning techniques to classify instance 532 into groupings of effectiveness. It may also input the event information and interaction information of the instances 532 to correlate conversions and time-to-conversions with different types of users 511 and their demographic attributes. For example, the trainer may discover that males between the ages of 25 and 40 convert at the highest rates and within the shortest time-to-conversions for a particular campaign, such as the Pet Adoption Agency campaign described with reference to FIG. 5B. Also, the trainer 595 may learn and determine that a certain day of the week and/or time of day yield the best results for conversions, such as Sundays between 7:30 PM and 9:30 PM. This information may then be used to determine which full communications 504 data to insert into limited communications 506.

Referring again to FIGS. 5A and 5C, in still other embodiments, the specific assets to add to the limited communications 506 are open-ended. Here, the trainer 595 uses machine learning to classify and examine event information and interactive information associated with the full communications 504 to determine appropriate assets to insert into the limited communications. For example, the trainer 595 can classify an amount of time users 511 have been subscribed to a service and/or the amount of time users 511 spend on the service to classify users 511 into groups denoting loyalty. The trainer 595 can determine that loyalty is a significant and/or primary attribute in predicting conversions. In so doing, the trainer 595 can update the limited communication 504 to include the necessary information to compute user 511 loyalty for transformed limited communication 506. The transformation, in some embodiments, can augment the limited communication data structure to add the necessary structural data elements the loyalty determination. It can be seen that this technique is more open-ended and flexible than inserted information into pre-existing data elements with their values initially set to "NULL".

Figure 6:
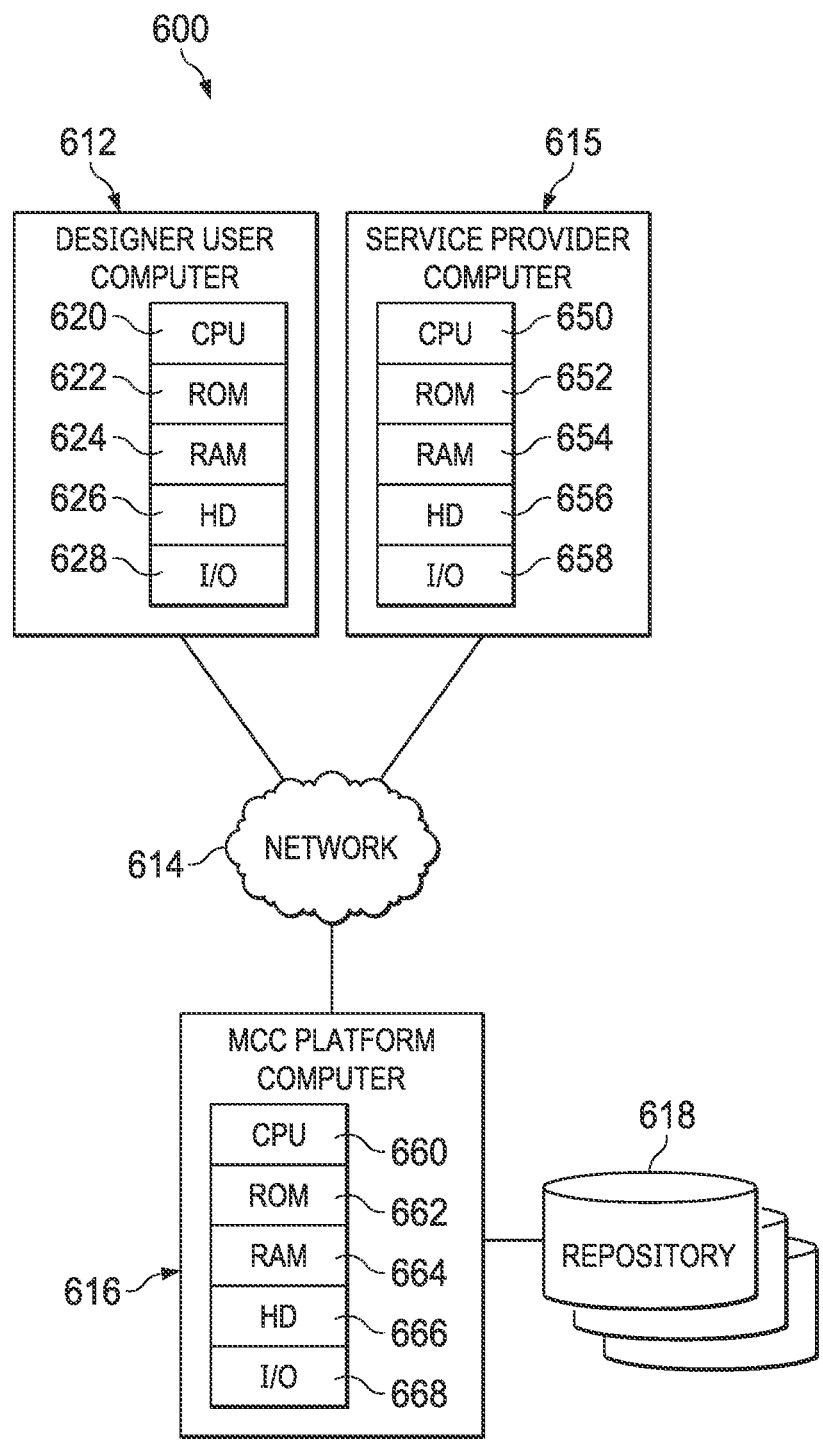
FIG. 6 depicts a diagrammatic representation of a distributed network computing environment where embodiments disclosed can be implemented.

FIG. 6 depicts a diagrammatic representation of a distributed network computing environment where embodiments of a data-driven solution for selecting recommended content based on positive customer response captured by interaction events can be implemented. The recommended content can be leveraged over multiple channels for delivering effective, consistent, and personalized content in a scalable, reproducible manner.

In the example illustrated in FIG. 6, network computing environment 600 includes network 614 that can be bi-directionally coupled to computer 612, computer 615, and computer 616. Computer 616 can be bi-directionally coupled to repository 618. Network 614 may represent a combination of wired and wireless networks that network computing environment 600 may utilize for various types of network communications known to those skilled in the art.

For the purpose of illustration, a single system is shown for each of computer 612, computer 615, and computer 616. However, with each of computer 612, computer 615, and computer 616, a plurality of computers (not shown) may be interconnected to each other over network 614. For example, a plurality of computers 612 and a plurality of computers 615 may be coupled to network 614. Computers 612 may include data processing systems for communicating with computer 616. Computers 612 may include data processing systems for content designers, modelers, etc. whose jobs may require them to design, build, and/or customize customer communications for CEM purposes.

Computer 612 can include central processing unit ("CPU") 620, read-only memory ("ROM") 622, random access memory ("RAM") 624, hard drive ("HD") or storage memory 626, and input/output device(s) ("I/O") 628. I/O 628 can include a keyboard, monitor, printer, electronic pointing device (e.g., mouse, trackball, stylus, etc.), or the like. Computer 612 can include a desktop computer, a laptop computer, a personal digital assistant, a cellular phone, or nearly any device capable of communicating over a network. Computer 615 may be similar to computer 612 and can comprise CPU 650, ROM 652, RAM 654, HD 656, and I/O 658. Computer 615 may collect and provide interaction events to computer 616 for training and building a multi-channel recommender model.

Likewise, computer 616 may include CPU 660, ROM 662, RAM 664, HD 666, and I/O 668. Computer 616 may provide multi-channel customer communications over network 614. In some embodiments, content owned (e.g., digital assets) by an enterprise may be stored in repository 618. Computer 616 may implement a multimodal multi-channel content recommender accessible by computer 612. Many other alternative configurations are possible and known to skilled artisans.

Each of the computers in FIG. 6 may have more than one CPU, ROM, RAM, HD, I/O, or other hardware components. For the sake of brevity, each computer is illustrated as having one of each of the hardware components, even if more than one is used. Each of computers 612, 615, and 616 is an example of a data processing system. ROM 622, 652, and 662; RAM 624, 654, and 664; HD 626, 656, and 666; and database 618 can include media that can be read by CPU 620, 650, or 660. Therefore, these types of memories include non-transitory computer-readable storage media. These memories may be internal or external to computers 612, 615, or 616.

Portions of the methods described herein may be implemented in suitable software code that may reside within ROM 622, 652, or 662; RAM 624, 654, or 664; or HD 626, 656, or 666. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines, or portions thereof described herein, where such software programming or code can be stored in a computer-readable medium and can be operated on by a processor to permit a computer to perform any of the steps, operations, methods, routines, or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals, or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise. The scope of the present disclosure should be determined by the following claims and their legal equivalents.

What is claimed is:

1. A method, comprising:
receiving, by a system executing on a processor, interaction events collected across disparate customer communication channels of an enterprise, the interaction events each representing an interaction between a respective customer and a communication channel, an interaction event of the interaction events referencing a content item;

processing the interaction events, the processing comprising:
  generating an encoded unique content item identifier that encodes a location in a content repository and the content item identifier referenced in the interaction event; and
  modifying the interaction event to include the encoded unique content item identifier such that the content item is resolvable to the location in the content repository;

building, by the system, a training data set using the interaction events thus processed;

training, by the system, a multi-channel content recommendation model using the training data set, wherein the multi-channel content recommendation model comprises a matrix, the training comprising:
  populating the matrix representing a universe of customers of the enterprise and a universe of content items across the disparate customer communication channels of the enterprise with event-based data points from the interaction events, the event-based data points representing sparse intersections of the customers and particular content items from the universe of content items, wherein the particular content items can be determined from the interaction events;
  determining, based on the event-based data points, additional data points for the matrix, the additional data points representing intersections of the customers and the other content items of the universe of content items that cannot be determined from the interaction events;
  computing an effectiveness score for each of the other content items; and
  filling the matrix with a corresponding effectiveness score at a corresponding data point for each of the content items of the universe of content items; and providing, by the system, the multi-channel content recommendation model thus trained to a recommender application, wherein the recommender application is accessible by content designers of the disparate customer communication channels to recommend content items of the universe of content items based on the interaction events collected across the disparate customer communication channels.

2. The method according to claim 1, wherein the generating the encoded unique content item identifier comprises:
  determining a content item identifier from the interaction event;
  determining the location in the content repository; and
  applying an encoding function to the content item identifier and the location in the content repository.

3. The method according to claim 2, wherein the encoding function encodes the content item identifier and the location in a form that is accessible to the recommender application.

4. The method according to claim 1, wherein the effectiveness score comprises a floating-point number between 0 and 1.

5. The method according to claim 1, further comprising:
  receiving, through the recommender application, a request for a recommendation on what content is effective for a customer or a customer segment of the enterprise; and
  querying the multi-channel content recommendation model on the customer or the customer segment of the enterprise, wherein multi-channel content recommendation model returns a set of content items for the customer or the customer segment of the enterprise, each of the set of content items having an effectiveness score.

6. The method according to claim 1, further comprising:
  applying a decoding function to the encoded unique content item identifier to obtain the location where the content item is stored in the content repository.

7. The method according to claim 1, wherein the disparate customer communication channels comprise at least two of a web channel, an email channel, a social media channel, or a messaging channel.

8. A system, comprising:
a processor;
a non-transitory computer-readable medium; and
stored instructions translatable by the processor for:
  receiving interaction events collected across disparate customer communication channels of an enterprise, the interaction events each representing an interaction between a respective customer and a communication channel, an interaction event of the interaction events referencing a content item;
  processing the interaction events, the processing comprising:
    generating an encoded unique content item identifier that encodes a location in a content repository and the content item identifier referenced in the interaction event; and
    modifying the interaction event to include the encoded unique content item identifier such that the content item is resolvable to the location in the content repository;
  building a training data set using the interaction events thus processed;
  training a multi-channel content recommendation model using the training data set, wherein the multi-channel content recommendation model comprises a matrix, the training comprising:
    populating the matrix representing a universe of customers of the enterprise and a universe of content items across the disparate customer communication channels of the enterprise with event-based data points from the interaction events, the event-based data points representing sparse intersections of the customers and particular content items from the universe of content items, wherein the particular content items can be determined from the interaction events;
    determining, based on the event-based data points, additional data points for the matrix, the additional data points representing intersections of the customers and the other content items of the universe of content items that cannot be determined from the interaction events;
    computing an effectiveness score for each of the other content items; and
    filling the matrix with a corresponding effectiveness score at a corresponding data point for each of the content items of the universe of content items; and
  providing multi-channel content recommendation model thus trained to a recommender application, wherein the recommender application is accessible by content designers of the disparate customer communication channels to recommend content items of the universe of content items based on the interaction events collected across the disparate customer communication channels.

9. The system of claim 8, wherein the generating the encoded unique content item identifier comprises:
   determining a content item identifier from the interaction event;
   determining the location in the content repository; and
   applying an encoding function to the content item identifier and the location in the content repository.

10. The system of claim 8, wherein the stored instructions are further translatable by the processor for:
   receiving, through the recommender application, a request for a recommendation on what content is effective for a customer or a customer segment of the enterprise; and
   querying the multi-channel content recommendation model on the customer or the customer segment of the enterprise, wherein multi-channel content recommendation model returns a set of content items for the customer or the customer segment of the enterprise, each of the set of content items having an effectiveness score.

11. The system of claim 8, wherein the stored instructions are further translatable by the processor for:
   applying a decoding function to the encoded unique content item identifier to obtain the location where the content item is stored in the content repository.

12. The system of claim 8, wherein the effectiveness score comprises a floating-point number between 0 and 1.

13. The system of claim 8, wherein the disparate customer communication channels comprise at least two of a web channel, an email channel, a social media channel, or a messaging channel.

14. A computer program product comprising a non-transitory computer-readable medium storing instructions translatable by a processor for:
   receiving interaction events collected across disparate customer communication channels of an enterprise, the interaction events each representing an interaction between a respective customer and a communication channel, an interaction event of the interaction events referencing a content item;
   processing the interaction events, the processing comprising:
      generating an encoded unique content item identifier that encodes a location in a content repository and the content item identifier referenced in the interaction event; and
      modifying the interaction event to include the encoded unique content item identifier such that the content item is resolvable to the location in the content repository;
   building a training data set using the interaction events thus processed;
   training a multi-channel content recommendation model using the training data set, wherein the multi-channel content recommendation model comprises a matrix, the training comprising:
      populating the matrix representing a universe of customers of the enterprise and a universe of content items across the disparate customer communication channels of the enterprise with event-based data points from the interaction events, the event-based data points representing sparse intersections of the customers and particular content items from the universe of content items, wherein the particular content items can be determined from the interaction events;
      determining, based on the event-based data points, additional data points for the matrix, the additional data points representing intersections of the customers and the other content items of the universe of content items that cannot be determined from the interaction events;
      computing an effectiveness score for each of the other content items; and
      filling the matrix with a corresponding effectiveness score at a corresponding data point for each of the content items of the universe of content items; and
      providing multi-channel content recommendation model thus trained to a recommender application, wherein the recommender application is accessible by content designers of the disparate customer communication channels to recommend content items of the universe of content items based on the interaction events collected across the disparate customer communication channels.

15. The computer program product of claim 14, wherein the generating the encoded unique content item identifier comprises:
   determining a content item identifier from the interaction event;
   determining the location in the content repository; and
   applying an encoding function to the content item identifier and the location in the content repository.

16. The computer program product of claim 15, wherein the encoding function encodes the content item identifier and the location in a form that is accessible to the recommender application.

17. The computer program product of claim 14, wherein the instructions are further translatable by the processor for:
   receiving, through the recommender application, a request for a recommendation on what content is effective for a customer or a customer segment of the enterprise; and
   querying the multi-channel content recommendation model on the customer or the customer segment of the enterprise, wherein multi-channel content recommendation model returns a set of content items for the customer or the customer segment of the enterprise, each of the set of content items having an effectiveness score.

18. The computer program product of claim 14, wherein the instructions are further translatable by the processor for:
   applying a decoding function to the encoded unique content item identifier to obtain the location where the content item is stored in the content repository.

19. The computer program product of claim 14, wherein the disparate customer communication channels comprise at least two of a web channel, an email channel, a social media channel, or a messaging channel.

20. The computer program product of claim 14, wherein the effectiveness score comprises a floating-point number between 0 and 1.

* * * * *